United States Patent Office 3,420,127
Patented Jan. 7, 1969

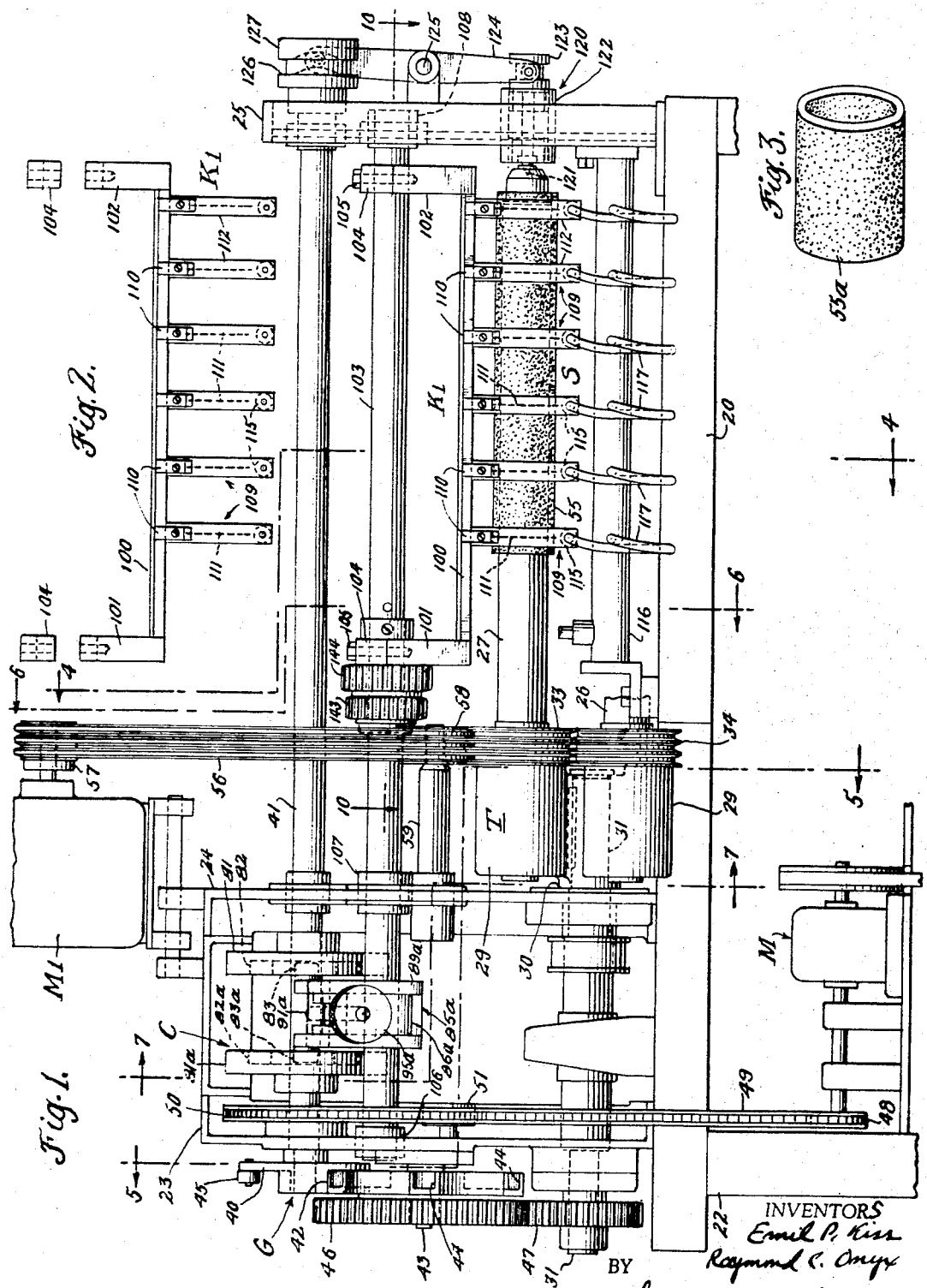

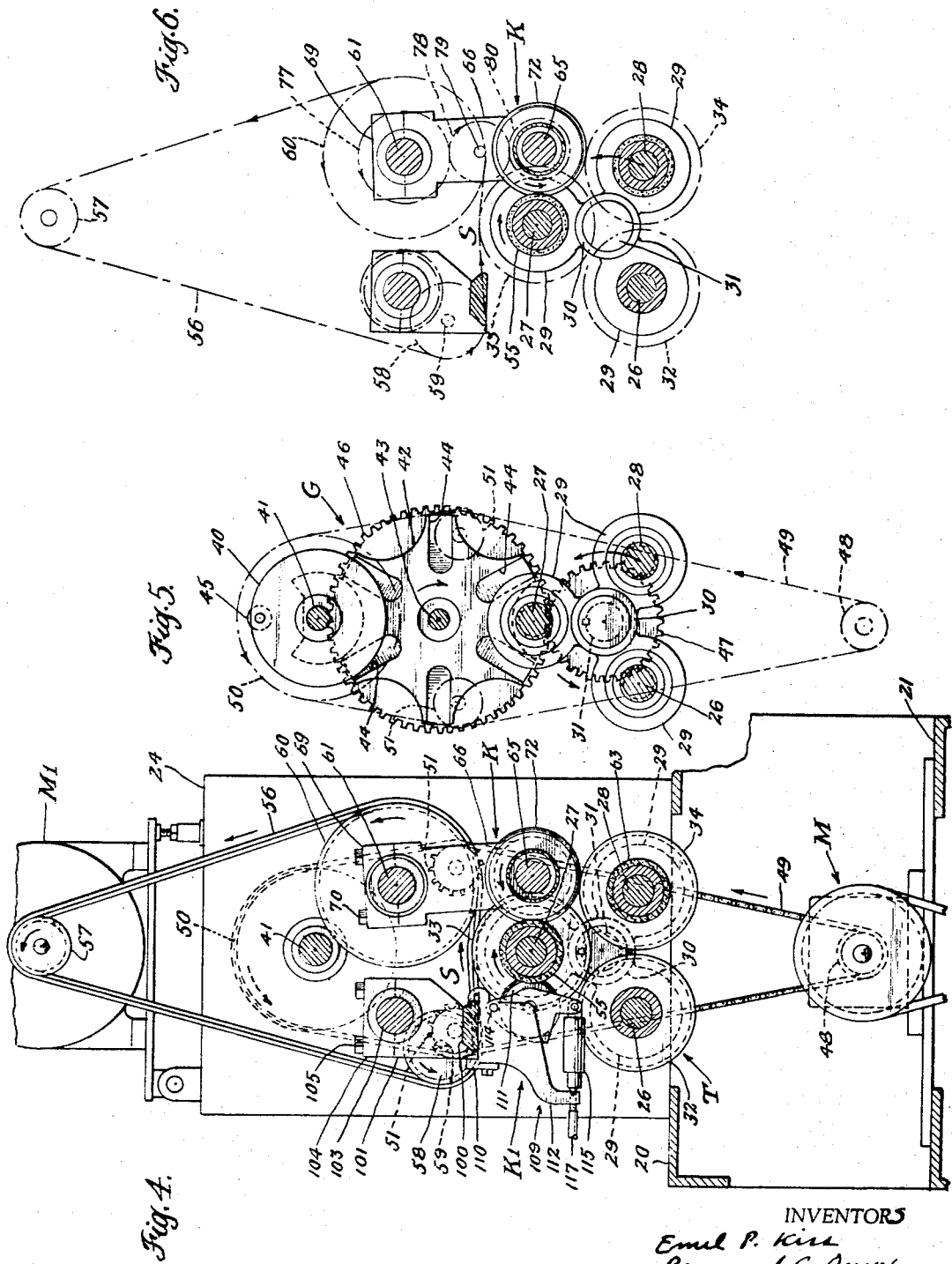

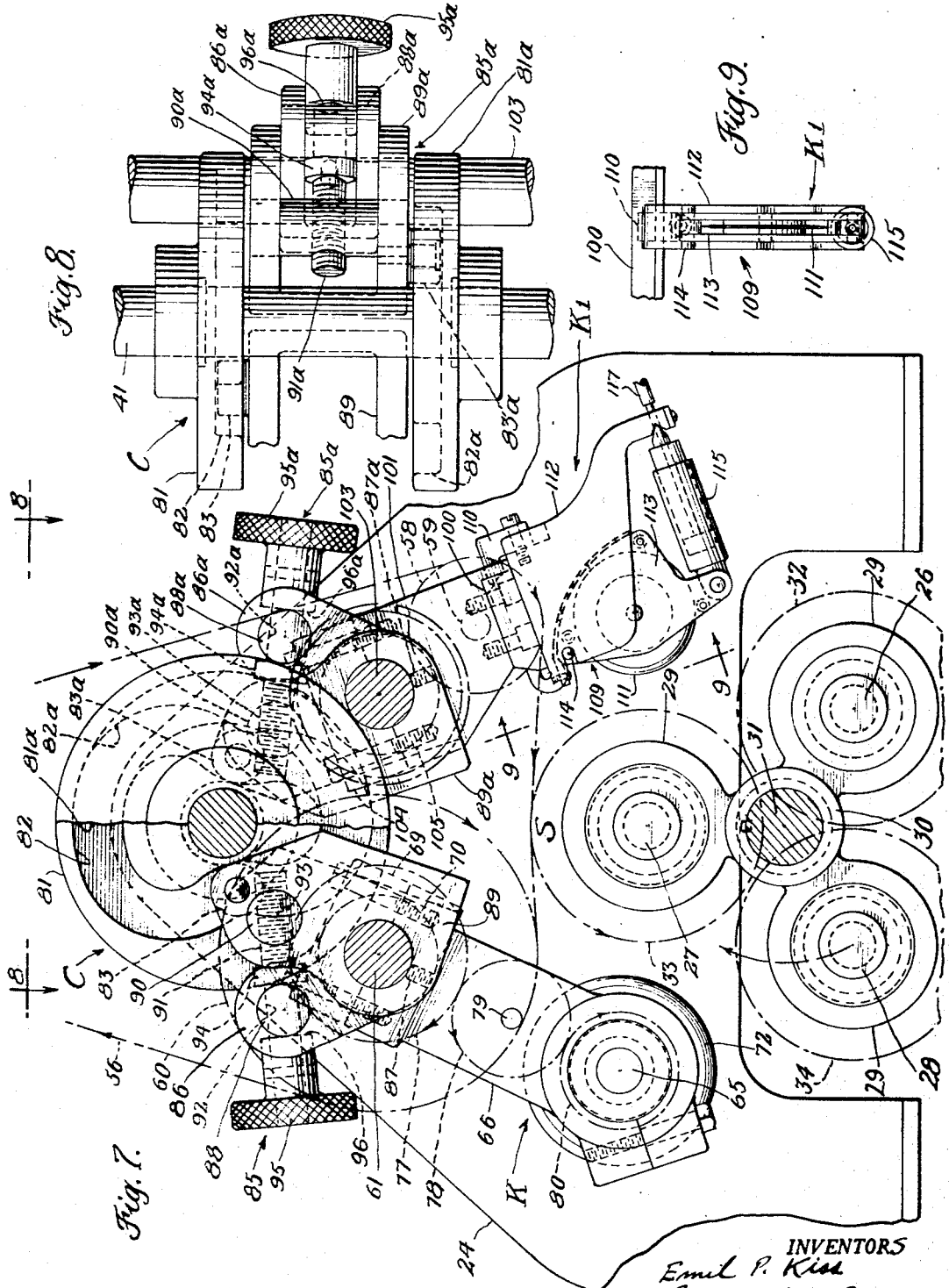

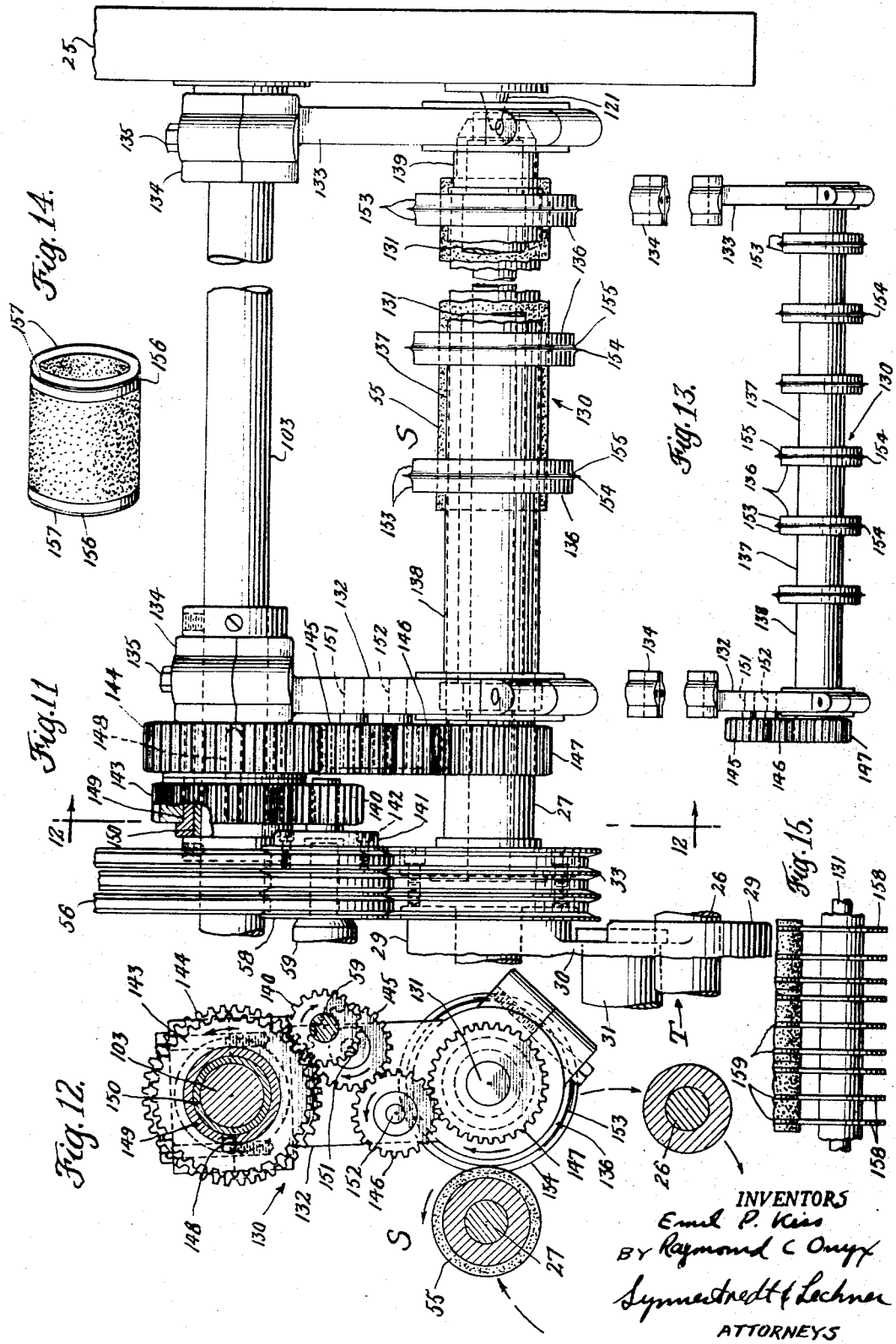

3,420,127
AUTOMATIC TUBE CUTTING MACHINE
Emil P. Kiss, Philadelphia, and Raymond C. Onyx, Ambler, Pa., assignors to Paco Winders, Inc., Philadelphia, Pa., a corporation of Pennsylvania
Filed Dec. 16, 1966, Ser. No. 602,223
U.S. Cl. 82—83                                           7 Claims
Int. Cl. B23b 3/04

ABSTRACT OF THE DISCLOSURE

An apparatus for cutting lengths of cardboard tubing into a plurality of sections and for performing finishing operations on the cut sections. A set of yieldable knives or alternatively a set of finishing tools are positioned in opposition to main cutting knives. The yieldable knives are used to perform final severance and the finishing tools are used for performing finishing operations such as burnishing, grooving and the like on the sections being cut.

Disclosure

This invention relates to a tube cutting machine for cutting a length of tubing into a plurality of shorter tube sections. It is particularly useful in the textile industry for cutting a length of cardboard tubing into a plurality of shorter tubes of specific length on which yarn is to be wound.

More particularly the invention relates to improved means for preventing damage, such as scarring or marring of the surface of the mandrel on which the tube to be cut is carried, and of preventing dulling of the knives or cutters by pressure contact of the knives with the mandrels in the cutting operation.

The invention further relates to means for performing finishing work on the cut tubes while in the cutting machine thus avoiding the necessity as is the case in present practices, of removing the cut sections of tubes from the cutting machine for placement in another machine for finishing operations. Thus in one aspect the machine of the present invention is a combined tube cutting and tube finishing machine whereby a great saving of time and a reduction of production costs are effected.

One of the primary objects of the invention is to provide a tube cutting machine in which provision is made for preventing dulling of the cutting knives and damage to the surface of the mandrel carrying the tube to be cut in a very effective manner and resulting in a clean, sharp severance of the tube sections.

Another object of the invention is the provision of a second set of knives in a tube cutting machine of the character described adapted to make the final severing cut with a minimum amount of cutting pressure.

Another object of the invention is the provision of a tube cutting machine employing one set of power driven knives for performing the major portion of the cut and a second set of free wheeling or yieldable cushioned knives for performing the remaining or severing cut.

In accordance with another aspect of the invention provision is made to perform certain finishing work on the tubes while they are being cut into tube sections. Examples of such finishing work of which the machine is capable are burnishing, surface treatment, embossing, grooving, printing, coating and perforating.

Still another object of the invention resides in the provision in a tube cutting machine employing a set of power driven cutting knives at one side of a tube carrying mandrel, of a detachable unit at the other side of the mandrel carrying yieldably loaded cutting knives opposed to the power driven knives adapted to be readily replaceable by a similar unit carrying power driven tools for performing finishing work on the cut tubes.

Another object has to do with the provision of means for adjusting the cutting knives and working tools into accurate working relation with the tube and mandrel.

The foregoing and other important objects are obtained by the preferred embodiment of the invention illustrated in the accompanying drawings in which:

FIGURE 1 is a side elevational view of a tube cutting machine constructed in accordance with the invention including a readily detachable air cushioned recutter or final cut unit;

FIGURE 2 is a detail view of the recutter unit of FIGURE 1 detached from the machine;

FIGURE 3 is a detail view of one of the tube sections cut from the original length of tubing;

FIGURE 4 is a cross section taken on the irregular line 4—4 of FIGURE 1, with the knife units in their cutting position;

FIGURE 5 is a cross section taken approximately on the irregular line 5—5 of FIGURE 1 illustrating a Geneva device for indexing a mandrel turret employed in the machine, the chain drive for the Geneva driver being indicated in dot and dash lines;

FIGURE 6 is a cross section taken on the irregular line 6—6 of FIGURE 1 with the drive belt, belt pulley and the gear train for driving the cutter knives being indicated in dot and dash lines;

FIGURE 7 is a cross section on an enlarged scale, taken approximately on the irregular line 7—7 of FIGURE 1 with the knife units shown in their retracted position and with the drive belt, the belt pulleys and the gear train for driving the main cutter knives indicated in dot and dash lines to enable showing parts hidden thereby in full lines;

FIGURE 8 is a fragmentary plan view, taken as indicated by the line 8—8 in FIGURE 7, of an adjusting device employed to enable accurate micrometer adjustment of the knife units;

FIGURE 9 is a detail view, taken as indicated by the arrows 9—9 in FIGURE 7, of one of the air cushioned knives;

FIGURE 11 is a broken out front elevational view illustrating a unit for performing burnishing or similar finishing operations on the cut tubes while still on the mandrel of the machine, adapted to be readily applied to the machine in place of the detachable air cushioned knife unit of FIGURES 1, 2, 4, 5 and 10;

FIGURE 12 is a cross section taken on the line 12—12 of FIGURE 11 illustrating the gear train for driving the work tools of the unit;

FIGURE 13 is a detail view of the work performing unit of FIGURE 11 detached from the machine;

FIGURE 14 is a detail view of a burnished section or length of cut tube; and

FIGURE 15 is a fragmentary detail view of another style of work tool employable in the unit of FIGURES 11 and 13 for providing grooves in the surface of the tube sections, for example, to prevent slippage of the yarn wound onto the tubes.

Figure 10:
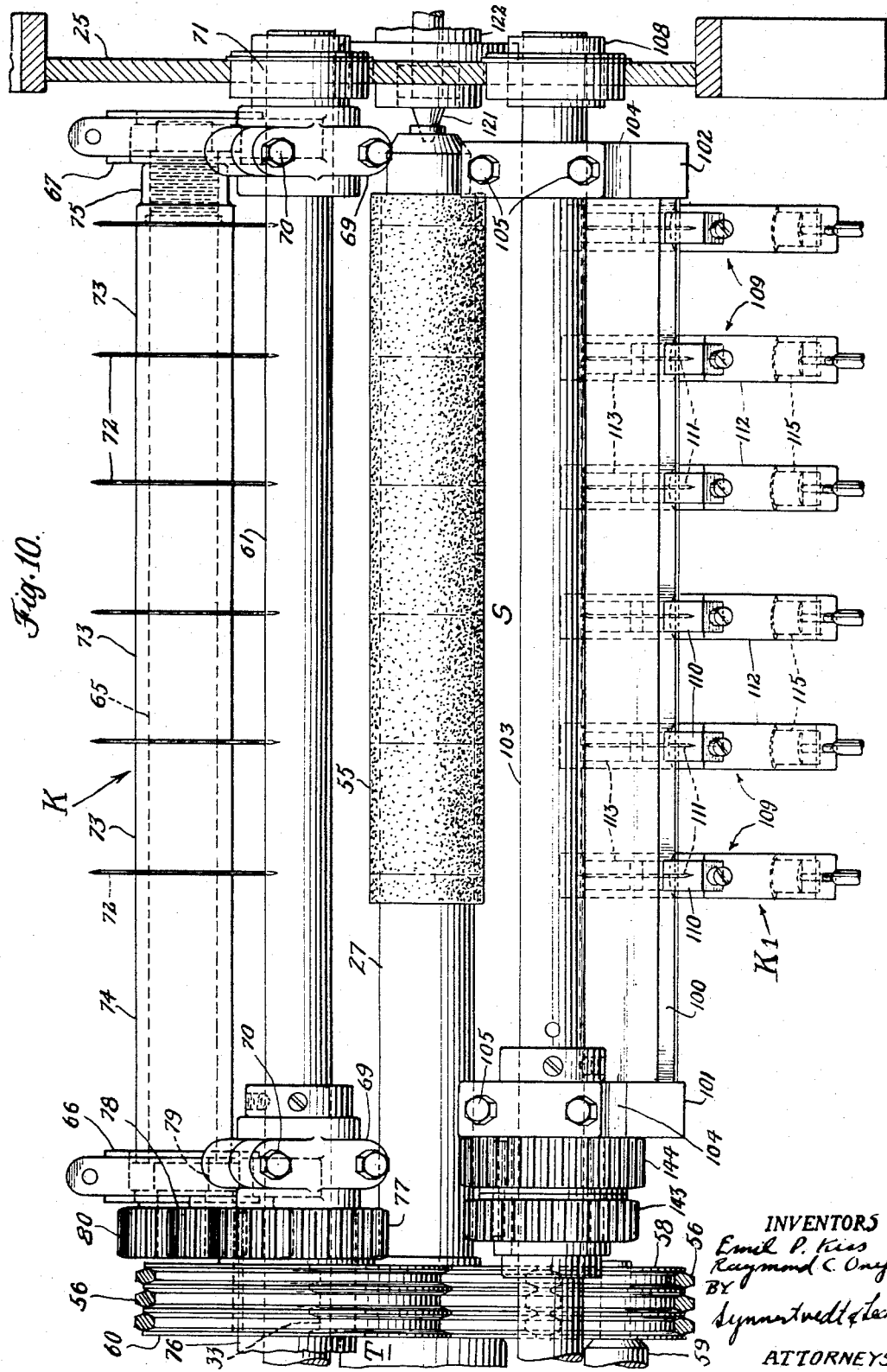
FIGURE 10 is a plan view taken as indicated by the line 10—10 in FIGURE 1 with the knife units in the retracted position shown in FIGURE 7.

Referring now in detail to the drawings the machine comprises in general framework including longitudinal framing members 20 and 21 and upright support members 22, 23, 24 and 25, a turret T having three parallel equally radially spaced tube carrying mandrels 26, 27 and 28, Geneva mechanism G for indexing the turret T, a main knife assembly K, a second knife assembly K1, cam mechanism C for oscillating the knife assemblies K and K1, a lower motor driven gear unit M driving the Geneva and cam mechanisms and an upper motor M1 for driving the indexed mandrel 27 and knife mechanism K.

The turret T comprises three equally radially spaced heads 29 in which the mandrels 26, 27 and 28 are rotatably mounted, a central hub 30 keyed on the turret indexing shaft 31, and mandrel drive pulleys 32, 33 and 34 for the three mandrels.

The Geneva mechanism G (FIGURES 1 and 5) comprises a Geneva driver 40 secured on the cam shaft 41, a Geneva indexing wheel 42 mounted on shaft 43 and having six indexing slots 44 with which the roller 45 of the driver 40 cooperates to intermittently rotate the indexing wheel 42, and a drive gear 46 secured to the indexing wheel.

The indexing gear 46 meshes with a gear 47 keyed on the turret indexing shaft 31 and it will be seen from the direction arrows in FIGURE 5 that the turret is indexed in a counter-clockwise direction as viewed in that figure. Drive is transmitted to the Geneva driver 40 by the motor driven gear unit M through means of sprocket 48, chain 49 and sprocket 50 secured on the cam shaft 41, it being noted that chain spreader idlers 51, 51 are provided for the chain 49 so that the chain will clear other parts (FIGURES 4 and 5).

As seen in FIGURES 4, 6 and 7 the turret T has been indexed to bring the mandrel 27, carrying a length of tube 55, to the cutting station S and this mandrel 27 is rotated in a clockwise direction as viewed in FIGURES 4 and 6 by reason of the pulley 33 of the mandrel 27 coming into driving engagement with the drive belt 56 which belt leads from the drive pulley 57 of the motor M1, over pulley 58 on shaft 59, then over pulley 33 of mandrel 27, then over pulley 60 on rock shaft 61 and back to the motor pulley 57.

It will be noted that in the indexed position of the turret first described the pulleys 32 and 34 and mandrels 26 and 28 are idle and that while a cutting operation is being performed on the length of tube 55 a length of tube 63 for subsequent cutting is loaded onto mandrel 28 and the previously cut tube sections 55a such as shown in FIGURE 3 are removed from the mandrel 26.

The main knife assembly K comprises a spindle 65 mounted for rotation in a pair of rock arms 66, 67 detachably secured on the rock shaft 61 by caps 69 and bolts 70. The rock shaft 61 is rockingly mounted in bearings carried by the upright supports 23, 24 and 25, the bearing 71 in the support 25 appearing in FIGURE 10.

The main cutter knives 72 of disk form, in this instance six (FIGURE 10), are mounted on the spindle 65 in even spacing by means of spacer sleeves 73 between the knives, and an end spacer sleeve 74 and a securing nut 75. The knives are power rotated by means of the belt driven pulley 60 which is keyed to a bushing 76 (FIGURE 10) which is freely rotatable on the rock shaft 61. A gear 77 is also keyed to the bushing 76 and meshes with a gear 78 rotatable on stud 79 carried by rock arm 66. The gear 78 meshes with a gear 80 secured on the knife spindle 65. Thus as indicated by the arrows in FIGURE 7 drive is imparted to the knives 72 in a clockwise direction as viewed in that figure.

It is to be observed that the rock shaft 61 is positioned to one side of the vertical center line of the mandrel 27 at station S and that the rock shaft 61 and knife spindle 65 are in parallel relation to the mandrel.

The knife assembly K is oscillated back and forth from the retracted position of FIGURE 7 to the cutting position of FIGURE 4 by a cam 81 on the cam shaft 41 having a cam groove 82 for the follower 83 suitably configured to oscillate the knife assembly K back and forth.

An important feature of the present invention is the provision of a method for cutting the tube carried by the mandrel into a plurality of shorter tubes sections which will prevent scarring or marring of the surface of the mandrel carrying the tube by pressure contact of the cutting knives 72 with the mandrel and also to prevent dulling of the knives as a result of such contact with the mandrel.

To the accomplishment of this end the present invention contemplates limiting the inward oscillation of the knives 72 to a point such that the depth of the cut made by the knives will fall to within a few thousands of the surface of the mandrel, i.e., to a depth that the sections are not severed from the length of tube and at which point there is no contact of the knives with the mandrel surface. The manner in which the invention contemplates a final severance of the sections will appear hereinafter.

In setting the machine up for operation the knife unit K is first adjusted on the rock shaft 61 in a position to make a cut approximating the desired depth by means of the caps 69 and bolts 70 and then a fine accurate adjustment to the desired depth is made by a micrometer adjusting device 85 (FIGURE 7). The device 85 comprises a bifurcated arm 86 secured on the rock shaft 61 as by means of set screw 87 carrying a swivel pin 88 at its bifurcated end, an arm 89 straddling the arm 86 mounted to rock freely on the rock shaft 61 carrying a swivel pin 90 and a micrometer screw 91 fitting a free hole 92 in the swivel pin 88 and threaded into a threaded hole 93 in the swivel pin 90. The screw 91 has a shouldered portion at 94 and is provided with an adjusting knob 95 having a shouldered portion 96. The shouldered portions 94 and 96 abut opposite sides of the swivel pin 88. The arm 89 carries the cam follower 83 above referred to.

By turning the knob 95 the knife unit K can be moved in or out as the case may be to accurately obtain the desired depth of cut.

The final severeance of the tube sections is accomplished by the knife unit K1 (FIGURES 1, 2, 4, 7 and 10) which comprises longitudinal support bar 100 carried by end rock arms 101 and 102 detachably secured on a rock shaft 103 by caps 104 and bolt 105. The rock shaft 103 is rockingly mounted in bearings 106, 107 and 108 in the upright supports 23, 24 and 25 in parallel relation to the mandrel 27 at station S and spaced to the side of mandrel 27 opposite that of the rock shaft 61 of the knife assembly K.

A plurality of knife units 109, in this instance six, corresponding to the number of knives 72 employed in the knife assembly K, are adjustably mounted, as by means of clamps 110, on the support bar 100 in spaced relation so that the free wheeling knives 111 of the units 109 are in alignment with the knives 72 of the knife assembly K as clearly seen in FIGURE 10.

Each knife unit 109 comprises a body member 112 securely clamped to the bar 100 by the clamps 110, a carrier 113 for the free wheeling knife 111 pivotally mounted, by means of pivot pin 114, in the body member 112 and cushioning means adapting the knife carrier to yield or be cushioned in its pivotal movement, in this instance in the form of an air actuated piston and cylinder device 115, although other known cushioning means such as a spring device for spring loading the knife may be employed.

Air under pressure is supplied to the piston and cylinder devices of the several knife units from an air manifold 116 and flexible air lines 117 (FIGURE 1).

The knife assembly K1 is oscillated back and forth from the retracted positions of FIGURE 7 to the cutting position of FIGURE 4 by a cam 81a, similar to the cam 81 above described, on the cam shaft 41 having a cam groove 82a for the follower 83a configured to oscillate the knife assembly K1 back and forth. Since both cams 81 and 81a are secured on the cam shaft 41 simultaneous action of the knife assemblies K and K1 occurs.

In setting the machine up for operation the knife unit K1 is first adjusted on the rock shaft 103, by means of the caps 104 and bolts 105, in a position so that the knives 111 will enter the slits made by the knife assembly K and will cut through the remaining thickness of material of the tube to the surface of the mandrel 27 with a cushioned contact of the knives with the mandrel by reason of the cushioning means 115. After having made this preliminary adjustment the knife assembly K1 is adjusted to a fine accurate adjustment by a micrometer adjusting device 85a similar to the micrometer adjusting device 85 above described and comprising like parts 86a–96a (FIGURES 7 and 8). In this instance the arm 89a carries the above mentioned cam follower 83a.

This fine adjustment is so made that the free wheeling knives 111 will have light contact with the surface of the mandrel 27 of insufficient magnitude to mar or scar the surface of the mandrel.

Another important advantage that is realized by this method of cutting a length of tubing into a plurality of tube sections by employing main knives to make a first cut leaving a thin connecting membrane of material and then employing a second set of cushioned knives to gently severe the membrane resides in the fact that a very clean sharp cut results without any tear effect which would leave burrs on the inner edges of the tubes. In this connection it is pointed out that in known tube cutting machines such internal tears and burrs occur when the knives become dull and the surface of the mandrel becomes scarred or married.

Reverting now to the mandrels 26, 27 and 28 it will be seen from FIGURE 1 that a centering device 120 is employed to center the indexed mandrel 27 comprising a center 121 rotatably and slidably mounted in a fitting 122 carried by the support 25 and having a grooved collar 123, a lever 124 pivoted at 125 forked at its lower end and having rollers operating in the groove of collar 123 and having a roller at its other end operating in the cam groove 126 of a cam 127 secured on the cam shaft 41. The cam shaft 126 is so configured and timed with the cams 81 and 81a and the Geneva mechanism G that when the knife assemblies K and K1 are rocked outwardly the center 121 is retracted and the next mandrel is indexed to the cutting station S and when the knife assemblies start to rock inwardly indexing is completed and the center 121 centers the indexed mandrel.

In FIGURES 11–15 a unit assembly 130 for performing various types of finishing work on the tube sections is illustrated which unit is adapted to be readily secured on the rock shaft 103 to replace the readily removable knife assembly unit K1.

The unit 130 comprises a spindle 131 mounted for rotation in a pair of rock arms 132, 133 detachably secured on the rock shaft 103 by caps 134 and bolts 135. Work tools 136, in this instance burnishing rolls, are mounted on the spindle 131 in even spacing, corresponding to the spacing of the cutter knives 72 of the knife unit K, by means of spacer sleeves 137 between the rolls and an end spacer sleeve 138 and a securing nut 139.

The burnishing rolls are power driven by means of the belt pulley 58 on shaft 59 above described. A drive pinion 140 is detachably secured to the pulley 58 to rotate therewith by flange 141 and screws 142. The drive pinion 140 meshes with gear 143 secured to gear 144 which meshes with gear 145 in turn meshing with gear 146 in turn meshing with gear 147.

The compound gear 143, 144 is keyed by means of key 148 to a sleeve 149 havng a bearing bushing 150 whereby the compound gear rotates freely on the rock shaft 103. The gears 145 and 146 are respectively mounted on studs 151 and 152 secured in the rock arm 132. Gear 147 is secured to the spindle 131.

It is to be noted from FIGURE 12 that the working mandrel 27 is rotated counterclockwise as viewed in that figure and that the train of gears just described causes rotation of the burnishing rolls in a clockwise direction. Thus surface friction which would occur if the mandrel and burnishing rolls were both rotated in the same direction is eliminated.

The burnishing rolls 136 are provided with two burnishing lands 153, 153 and a central ridge 154, the lands merging into the ridge with curved surfaces 155. In burnishing position the ridges of the rolls enter the cuts of the tube and the lands of the rolls form the end burnished surfaces 156, 156 while curved surfaces 155 round the edges 157 of the tube sections as shown in FIGURE 14.

Another example of a finishing operation is illustrated in FIGURE 15 in which grooving disks 158 are provided on the spindle for forming grooves 159 in the surfaces of the tube sections. Such grooves are desirable where yarn is wound on the tubes to prevent the yarn from creeping off of the tubes.

In some instances it may be desirable to have the finishing tools free wheeling instead of power driven in which case the drive pinion 140 is detached from the drive pulley 58 by removing the screws 142. It is also preferable to remove the drive pinion 140 when employing the final cut knife unit K1 so that the compound gear 143, 144 will not run idle.

What is claimed is:

1. In an automatic tube cutting machine the combination of:
   a mandrel carrying a length of tubing;
   a set of longitudinally spaced power driven knives positioned at one side of said mandrel in parallel relation thereto;
   means for moving said knives into cutting relation with said tubing;
   means for limiting the depth of cut of said knives to slit said length of tubing into a plurality of connected tube sections;
   a set of longitudinally spaced free wheeling knives positioned at the other side of said mandrel in parallel relation thereto and in alignment with said first set of knives;
   means for movng said second set of knives into the slits performed by said first set of knives to sever the length of tubing into a plurality of disconnected tube sections; and
   means for yieldingly mounting said free wheeling knives.

2. An automatic tube cutting machine in accordance with claim 1 and further including means for simultaneously actuating said two knife movng means.

3. In an automatic tube cutting machine the combination of:
   a mandrel carrying a length of tubing;
   a set of longitudinally spaced knives positioned at one side of said mandrel in parallel relation thereto for slitting said length of tubing into a plurality of connected tube sections;
   a second set of longitudinally spaced knives positioned at the opposite side of said mandrel in parallel relation thereto and in alignment with said first set of knives;
   means for moving said first set of knives into slitting position; and
   means for moving said second set of knives into the slits performed by said first set of knives to sever said length of tubing into a plurality of disconnected tube sections.

4. An automatic tube cutting machine according to claim 3 wherein said moving means for said first set of knives includes means adapted to limit the depth of cut of the first set of knives and wherein the knives of said second set are provided with means adapting them to yield whereby a cushioned severing cut is made by the knives.

5. In an automatic tube cutting machine the combination with a mandrel carrying a length of tubing;
   a set of longitudinally spaced cutting knives positioned at one side of said mandrel in parallel relation thereto for cutting said lengths of tubing into a plurality of shorter tubes;
   means for moving said set of knives into tube cutting position;

a set of working tools positioned at the opposite side of said mandrel in parallel relation thereto; and means for moving said set of working tools into work performing relation to said tubing.

6. An automatic tube cutting machine according to claim 5 wherein said set of working tools comprises a plurality of longitudinally spaced burnishing tools disposed in alignment with said first mentioned cutting knives adapted to burnish the end portions of the cut tubes and to round the peripheral end edges thereof.

7. In an automatic tube cutting machine the combination of:

a rotatable turret having a plurality of radially spaced parallel tube carrying mandrels;

means for indexing said turret to successively rotate said mandrels to a tube cutting station;

a set of longtudinally spaced cutting knives positioned at said station at one side of an indexed tube carrying mandrel in parallel relation thereto;

means for rocking said knives into cutting relation with the tube of said indexed mandrel;

a set of working tools positioned at the other side of said indexed mandrel in parallel relation thereto; and means for rocking said set of working tools into work performing relation to the tube carried by said indexed mandrel.

References Cited

UNITED STATES PATENTS

| | | | |
|---|---|---|---|
| 1,799,749 | 4/1931 | Hoppes | 82—101 |
| 2,114,272 | 4/1938 | Temple | 82—70.1 |
| 2,298,366 | 10/1942 | Gladfelter | 82—101 X |
| 3,084,578 | 4/1963 | Hartford | 82—60 |
| 3,190,158 | 6/1965 | Snyderman | 82—101 |
| 3,302,500 | 2/1967 | Hackenberger | 82—101 X |

HARRISON L. HINSON, *Primary Examiner.*

U.S. Cl. X.R.

82—101